UNITED STATES PATENT OFFICE.

EMMA S. COLEMAN, OF BEATRICE, NEBRASKA.

COMPOSITION OF MATTER FOR PRESERVING EGGS.

1,120,029.  Specification of Letters Patent.  Patented Dec. 8, 1914.

No Drawing.    Application filed January 29, 1914.   Serial No. 815,293.

*To all whom it may concern:*

Be it known that I, EMMA S. COLEMAN, a citizen of the United States, residing at Beatrice, in the county of Gage and State of Nebraska, have invented a new and useful Composition of Matter to be Used for Preserving Eggs in an Edible and Digestible Condition.

My composition is composed of the following ingredients in the proportions appended: pure grain alcohol one quantity, cotton-seed oil 1/15 of the first quantity, sheet gutta-percha dissolved in chloroform 1/5 of the first quantity.

(Gutta-percha chips do not dissolve so readily as the same prepared in sheet form. To dissolve the chips carbon bisulfid is more efficient, though its odor, for a time, is very unpleasant.)

The gutta-percha and oil must first be thoroughly mingled by agitation, the alcohol then added and all thoroughly mingled together.

This composition applied to the shell of eggs dries before it can penetrate the shell and reach the egg, leaving a light coating of gutta-percha, modified by oil, on the shell. This excludes the air with its microbes, bad odors, &c. Eggs so protected are preserved in better condition, without taking into account temperature, time of storing or any circumstance, than without such protection. They can be preserved in a higher degree of temperature with such protection than without such protection.

I claim:

The herein described composition of grain alcohol, gutta-percha, dissolved, and cotton-seed oil in the proportions named and for the purpose of excluding all extraneous matter from eggs to the shells of which it is applied.

EMMA S. COLEMAN.

Witnesses:
MARGARET FLETCHER,
FRANCES FULLER.